United States Patent
Amigud et al.

(10) Patent No.: US 9,836,498 B2
(45) Date of Patent: *Dec. 5, 2017

(54) ENABLING TESTING OF PRODUCTION SYSTEMS WITHOUT AFFECTING CUSTOMER DATA SETS SYSTEM AND METHOD

(71) Applicant: International Business Machines Corporation, Armonk, NY (US)

(72) Inventors: Eugene Amigud, Northborough, MA (US); Bhuvan Ananthanarayanan, Bangalore (IN); Adam Elliott, Milford, NH (US); Krishnamurthy Muralidhar, Acton, MA (US); Leho Nigul, Ontario (CA); Sanjeev Siotia, Southborough, MA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/612,856

(22) Filed: Feb. 3, 2015

(65) Prior Publication Data

US 2015/0302044 A1  Oct. 22, 2015

Related U.S. Application Data

(63) Continuation of application No. 14/256,198, filed on Apr. 18, 2014.

(51) Int. Cl.
*G06F 17/00* (2006.01)
*G06F 17/30* (2006.01)
*G06F 11/36* (2006.01)

(52) U.S. Cl.
CPC .... *G06F 17/30371* (2013.01); *G06F 11/3692* (2013.01); *G06F 11/3696* (2013.01); *G06F 17/30082* (2013.01)

(58) Field of Classification Search
CPC .......... G06F 17/30371; G06F 11/3692; G06F 11/3696; G06F 17/30082
USPC ........................................................ 707/694
See application file for complete search history.

(56) References Cited

U.S. PATENT DOCUMENTS

| | | | | |
|---|---|---|---|---|
| 6,055,463 A | * | 4/2000 | Cheong | B07C 5/344 209/571 |
| 8,418,010 B2 | * | 4/2013 | Rivoir | G11C 29/56 714/702 |
| 2006/0129587 A1 | * | 6/2006 | Renfro | G06F 21/604 707/999.102 |
| 2006/0195585 A1 | * | 8/2006 | Samayamantry | H04L 51/14 709/227 |

(Continued)

*Primary Examiner* — Phong H Nguyen
(74) *Attorney, Agent, or Firm* — Brian J. Colandreo, Esq.; Jeffrey T. Placker, Esq.; Holland & Knight LLP

(57) ABSTRACT

A method, computer program product, and computer system for matching, at a computing device, one or more parameters of test data to one or more rules. A location of a data store is selected to store results of the test data, wherein the location is selected based upon, at least in part, the one or more rules matched to the one or more parameters of the test data. The results of the test data is separated from results of production data by storing the results of the test data at the location of the data store selected based upon, at least in part, the one or more rules matched to the one or more parameters of the test data.

5 Claims, 5 Drawing Sheets

(56) References Cited

U.S. PATENT DOCUMENTS

| | | | |
|---|---|---|---|
| 2008/0082834 A1 | 4/2008 | Mattsson | |
| 2010/0011252 A1* | 1/2010 | Rivoir | G11C 29/56 714/32 |
| 2010/0030521 A1* | 2/2010 | Akhrarov | G06K 9/622 702/182 |
| 2012/0290527 A1* | 11/2012 | Yalamanchilli | G06F 17/30592 707/602 |
| 2013/0031044 A1* | 1/2013 | Miranda | G06N 5/025 706/47 |
| 2013/0042146 A1 | 2/2013 | Unger et al. | |
| 2013/0124567 A1* | 5/2013 | Balinsky | G06F 17/30011 707/783 |
| 2014/0244301 A1* | 8/2014 | Lee | G06F 19/3418 705/3 |
| 2015/0020049 A1* | 1/2015 | Caufield | G06F 11/3684 717/124 |
| 2015/0189001 A1* | 7/2015 | Lee | H04L 67/10 705/3 |

* cited by examiner

ENABLING TESTING OF PRODUCTION SYSTEMS WITHOUT AFFECTING CUSTOMER DATA SETS SYSTEM AND METHOD

RELATED APPLICATIONS

The subject application is a continuation application of U.S. patent application Ser. No. 14/256,198, filed on Apr. 18, 2014, the entire content of which is herein incorporated by reference.

BACKGROUND

Functional and system test verification of software deployed on production systems may be one of the more critical parts of the software development lifecycle. This may be especially true in the cloud environments and applications, where customer facing systems may be equivalent to Software Verification Tests (SVT) and Performance Verification Environments. When testing in such environments, however, the real production data (e.g., the actual data used by a company for customer invoices, reports, etc.) may be "polluted" with test data.

BRIEF SUMMARY OF DISCLOSURE

In one implementation, a method, performed by one or more computing devices, may include but is not limited to matching, at a computing device, one or more parameters of test data to one or more rules. A location of a data store may be selected to store results of the test data, wherein the location may be selected based upon, at least in part, the one or more rules matched to the one or more parameters of the test data. The results of the test data may be separated from results of production data by storing the results of the test data at the location of the data store selected based upon, at least in part, the one or more rules matched to the one or more parameters of the test data.

One or more of the following features may be included. The one or more parameters may include a business parameter. The business parameter may include an IP range. The business parameter may include a company ID. The data store may include a shard. The shard may represent a partition of at least the results of the test data. The production data may be stored in a production data store, wherein the production data store may be different than the data store selected based upon, at least in part, the one or more rules matched to the one or more parameters of the test data.

In another implementation, a computing system includes a processor and a memory configured to perform operations that may include but are not limited to matching one or more parameters of test data to one or more rules. A location of a data store may be selected to store results of the test data, wherein the location may be selected based upon, at least in part, the one or more rules matched to the one or more parameters of the test data. The results of the test data may be separated from results of production data by storing the results of the test data at the location of the data store selected based upon, at least in part, the one or more rules matched to the one or more parameters of the test data.

One or more of the following features may be included. The one or more parameters may include a business parameter. The business parameter may include an IP range. The business parameter may include a company ID. The data store may include a shard. The shard may represent a partition of at least the results of the test data. The production data may be stored in a production data store, wherein the production data store may be different than the data store selected based upon, at least in part, the one or more rules matched to the one or more parameters of the test data.

In another implementation, a computer program product resides on a computer readable storage medium that has a plurality of instructions stored on it. When executed by a processor, the instructions cause the processor to perform operations that may include but are not limited to matching one or more parameters of test data to one or more rules. A location of a data store may be selected to store results of the test data, wherein the location may be selected based upon, at least in part, the one or more rules matched to the one or more parameters of the test data. The results of the test data may be separated from results of production data by storing the results of the test data at the location of the data store selected based upon, at least in part, the one or more rules matched to the one or more parameters of the test data.

One or more of the following features may be included. The one or more parameters may include a business parameter. The business parameter may include an IP range. The business parameter may include a company ID. The data store may include a shard. The shard may represent a partition of at least the results of the test data. The production data may be stored in a production data store, wherein the production data store may be different than the data store selected based upon, at least in part, the one or more rules matched to the one or more parameters of the test data.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
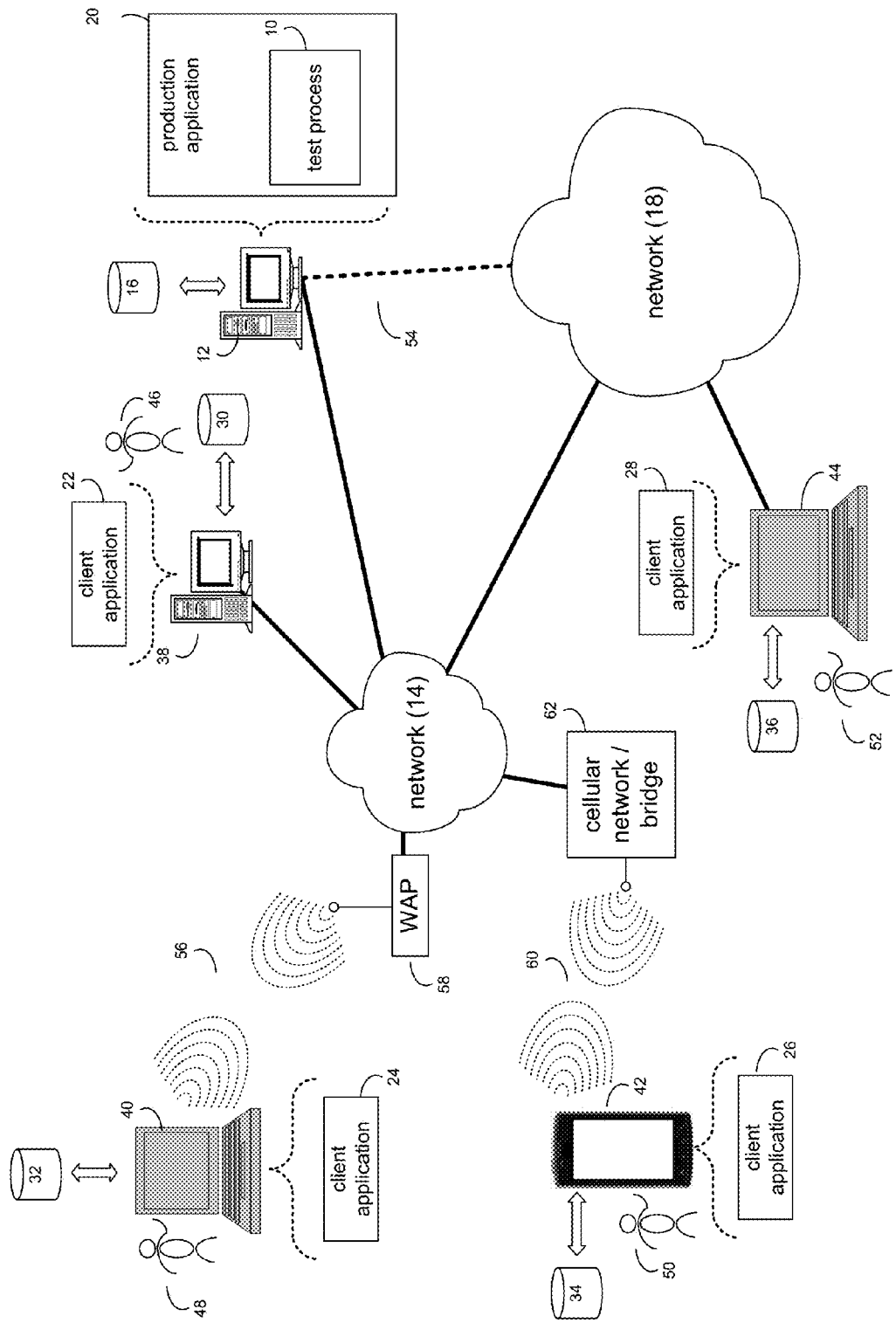
FIG. 1 is an illustrative diagrammatic view of a test process coupled to a distributed computing network according to one or more implementations of the present disclosure.

System Overview:

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown test process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, test process 10 may match, at a computing device, one or more parameters of test data to one or more rules. A location of a data store may be selected to store results of the test data, wherein the location may be selected based upon, at least in part, the one or more rules matched to the one or more parameters of the test data. The results of the test data may be separated from results of production data by storing the results of the test data at the location of the data store selected based upon, at least in part, the one or more rules matched to the one or more parameters of the test data.

The instruction sets and subroutines of test process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Test process 10 may be a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a production (environment) application (e.g., production application 20), which may generally be described as a setting where software and other products may actually be put into operation for their intended uses by end users. A production environment may be thought of as a real-time setting where programs may be run and hardware setups may be installed and relied on for organization or commercial daily operations. In a testing environment, a product may still be used theoretically. Users, typically engineers, may look for bugs or design flaws. In the production environment, the product may have been delivered and may need to work (nearly) flawlessly. Examples of production application 20 may include, but are not limited to, e.g., a customer facing system application, an SVT and Performance verification environment application, a functional and system test verification application, a software development lifecycle application, or other application that allows for the functional and system test verification of software deployed on production systems. Test process 10 and/or production application 20 may be accessed via client applications 22, 24, 26, 28. Test process 10 may be a stand alone application, or may be an applet/application/script/extension that may interact with and/or be executed within production application 20, a component of production application 20, and/or one or more of client applications 22, 24, 26, 28. Production application 20 may be a stand alone application, or may be an applet/application/script/extension that may interact with and/or be executed within test process 10, a component of test process 10, and/or one or more of client applications 22, 24, 26, 28. One or more of client applications 22, 24, 26, 28 may be a stand alone application, or may be an applet/application/script/extension that may interact with and/or be executed within and/or be a component of test process 10 and/or production application 20. Examples of client applications 22, 24, 26, 28 may include, but are not limited to, e.g., a customer facing system application, an SVT and Performance verification environment application, a functional and system test verification application, a software development lifecycle application, or other application that allows for the functional and system test verification of software deployed on production systems, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of test process 10 (and vice versa). Accordingly, test process 10 may be a purely server-side application, a purely client-side application, or a hybrid server-side/client-side application that is cooperatively executed by one or more of client applications 22, 24, 26, 28 and/or test process 10.

One or more of client applications 22, 24, 26, 28 may be configured to effectuate some or all of the functionality of production application 20 (and vice versa). Accordingly, production application 20 may be a purely server-side application, a purely client-side application, or a hybrid server-side/client-side application that is cooperatively executed by one or more of client applications 22, 24, 26, 28 and/or production application 20. As one or more of client applications 22, 24, 26, 28, test process 10, and production application 20, taken singly or in any combination, may effectuate some or all of the same functionality, any description of effectuating such functionality via one or more of client applications 22, 24, 26, 28, test process 10, production application 20, or combination thereof, and any described interaction(s) between one or more of client applications 22, 24, 26, 28, test process 10, production application 20, or combination thereof to effectuate such functionality, should be taken as an example only and not to limit the scope of the disclosure.

Users 46, 48, 50, 52 may access computer 12 and test process 10 (e.g., using one or more of client electronic devices 38, 40, 42, 44) directly through network 14 or through secondary network 18. Further, computer 12 may be connected to network 14 through secondary network 18, as illustrated with phantom link line 54. Test process 10 may include one or more user interfaces, such as browsers and textual or graphical user interfaces, through which users 46, 48, 50, 52 may access test process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
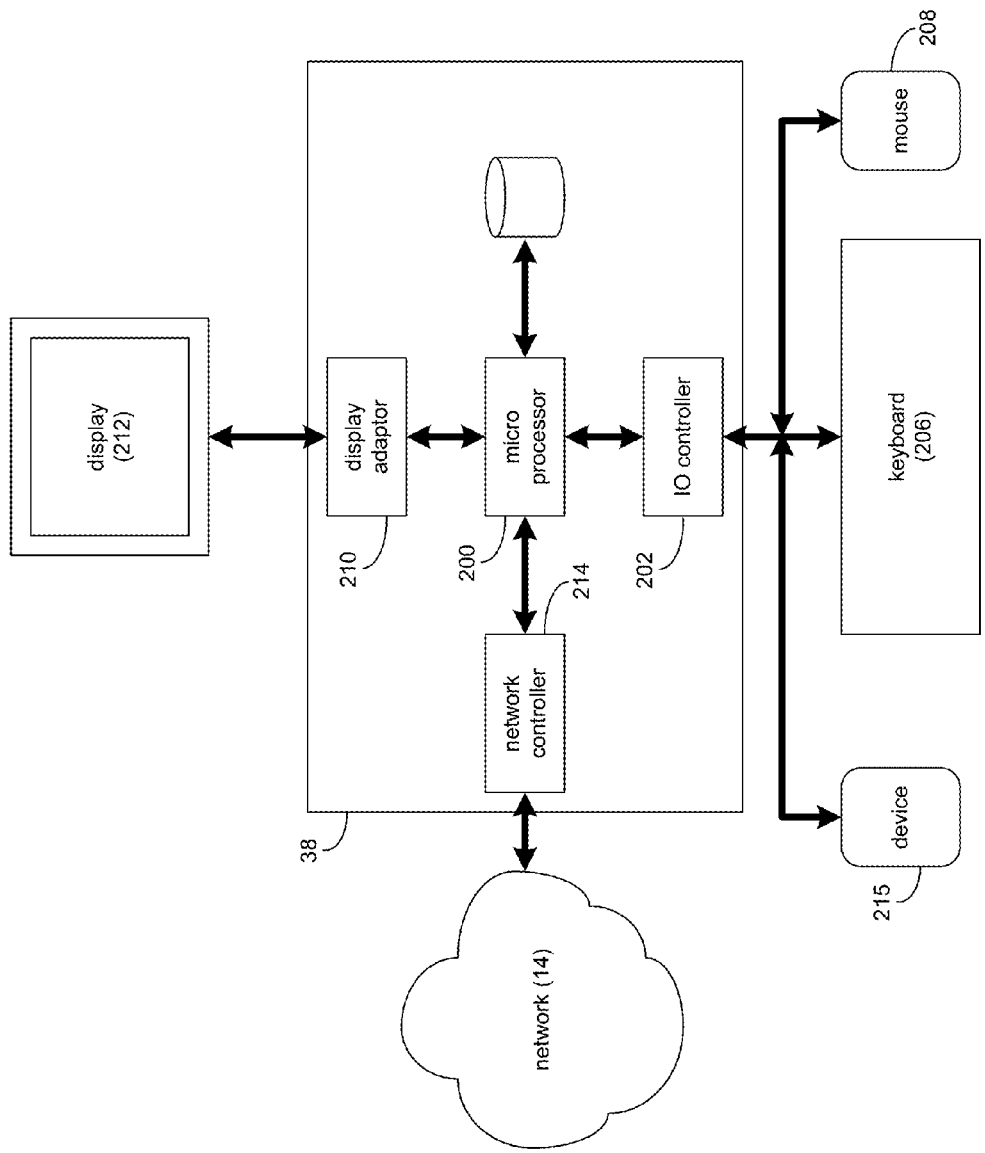
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, test process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
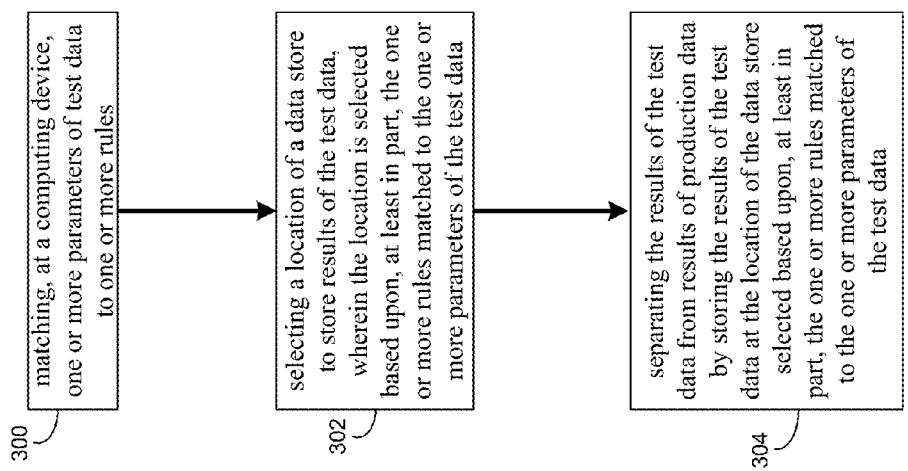
FIG. 3 is an illustrative flowchart of the test process of FIG. 1 according to one or more implementations of the present disclosure.
Figure 4:
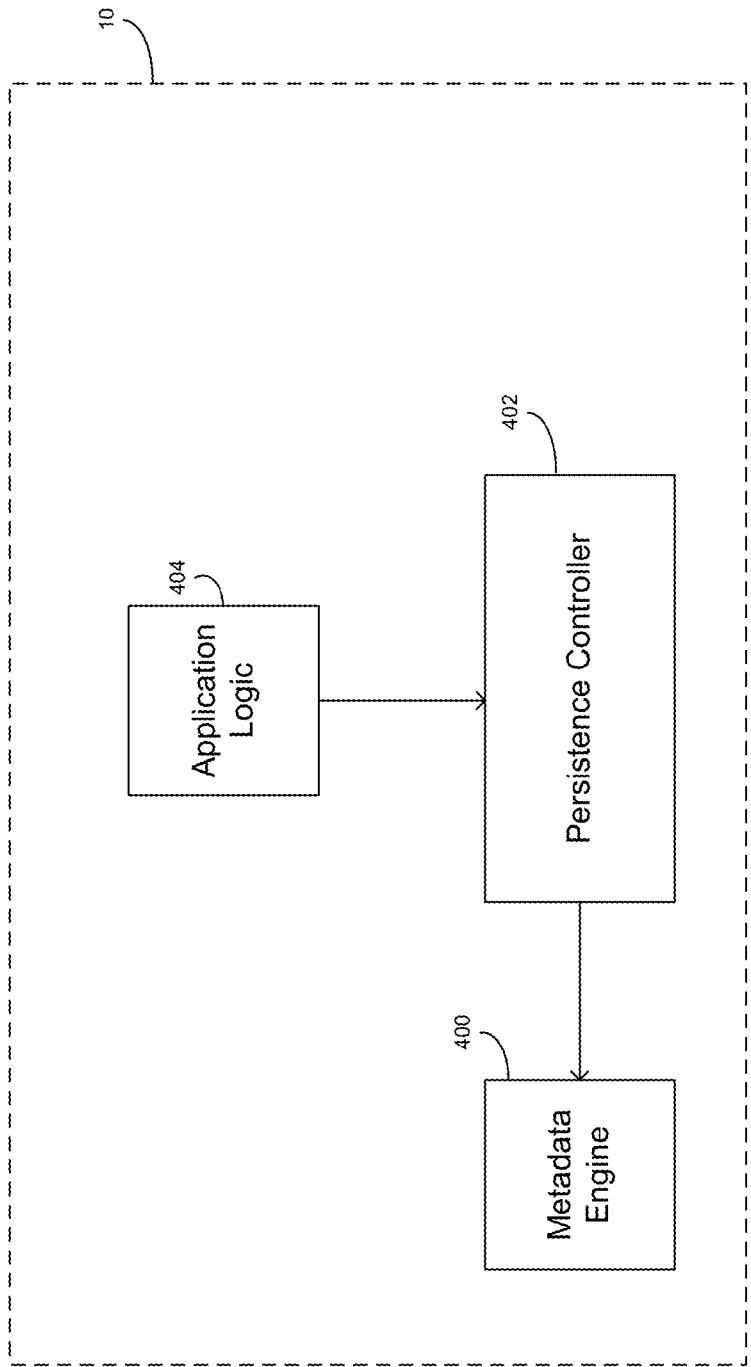
FIG. 4 is an illustrative diagrammatic view of the test process of FIG. 1 according to one or more implementations of the present disclosure.
Figure 5:
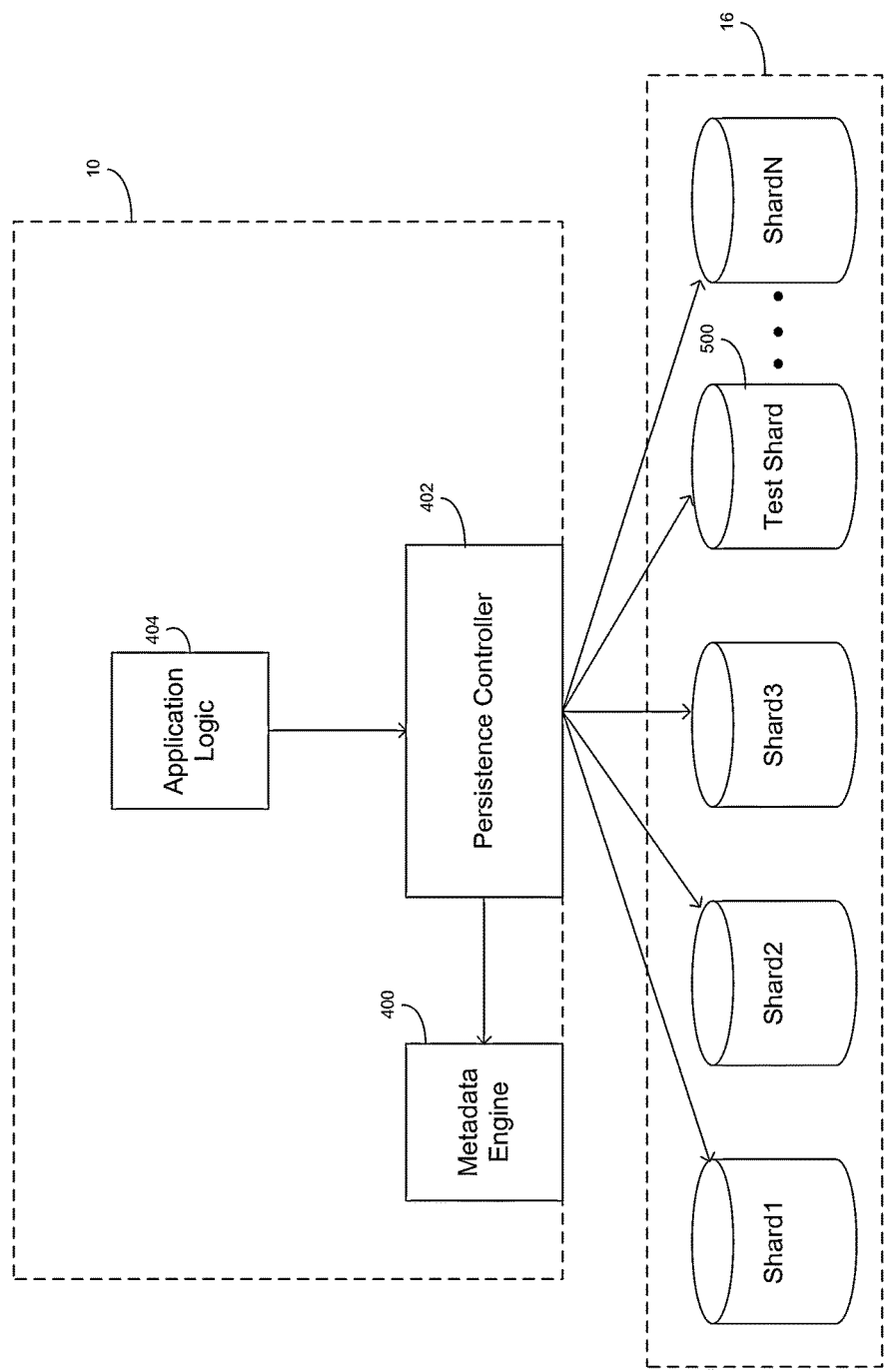
FIG. 5 is an illustrative diagrammatic view of an example testing environment according to one or more implementations of the present disclosure.

The Test Process:

As discussed above and referring also to FIGS. 3-5, test process 10 may match 300, at a computing device, one or more parameters of test data to one or more rules. Test process 10 may select 302 a location of a data store to store results of the test data, wherein the location may be selected 302 based upon, at least in part, the one or more rules matched 300 to the one or more parameters of the test data. Test process 10 may separate 304 the results of the test data from results of production data by storing the results of the test data at the location of the data store selected 302 based upon, at least in part, the one or more rules matched 300 to the one or more parameters of the test data.

Functional and system test verification of software deployed on production systems may be one of the more critical parts of the software development lifecycle. This may be especially true in the cloud environments and applications, where customer facing systems may be equivalent to Software Verification Tests (SVT) and Performance Verification Environments. When testing in such environments, however, the real (customer) production data (e.g., the actual data used by a company for customer invoices, reports, etc.) may be "polluted" with test data.

For example, consider a typical cloud hosted e-Commerce solution. Such a solution may be deployed on the cloud and customers may often pay percentage of their revenue. If testing against such a deployment is desired, it may be beneficial to be careful on which data is generated, so that, e.g., it is not included in customer invoices or reports, and does not affect the performance of databases that contain customer production data.

Some solutions for this problem may be to mimic the production environment and do all the testing there; however, such mimicking may not be 100% accurate and may introduce significant costs to the solution (e.g., imagine costs associated with "mimicking" production environments of airlines, e-Commerce auction sites with billions of transactions, or any other big SaaS solution).

Assume for example purposes only that user 46 desires to perform internal testing with their own test data. Additionally/alternatively, assume for example purposes only that user 46 (e.g., via test process 10) detects a potential performance problem and desires to test it with specific test data, but at the same time, user 46 does not want to affect the performance of the production site and/or does not want to mix test data into real transactional (e.g., production) data. For instance, some companies may charge customers (e.g., user 46) "by submitted order"; however, those companies would not want to charge user 46 for "test orders" generated during the system test, and separating real submitted orders from the test submitted orders may be a difficult process in any environment, but particularly a multi-tenant environment.

Thus, in some implementations, test process 10 may match 300, at a computing device (e.g., computer 12), one or more parameters of test data to one or more rules. For example, and referring at least to FIG. 4, test process 10 may include a metadata engine (e.g., metadata engine 400). As will be discussed below, metadata engine 400 of test process 10 may match 300 the parameters (e.g., "metadata sharding parameters") of the test data to a specific database partition. The parameters may be flexible, and may represent different things. For example, in some implementations, the one or more parameters may include a business parameter. In some implementations, the business parameter may include an IP range. As another example, the business parameter may include a company ID. It will be appreciated that business parameters may pertain to other business specific parameters (e.g., an order number from a customer's purchase) without departing from the scope of the disclosure.

In some implementations, test process 10 may select 302 a location of a data store to store results of the test data, wherein the location may be selected 302 based upon, at least in part, the one or more rules matched 300 to the one or more parameters of the test data. For instance, and continuing with the above example where user 46 desires to perform internal testing with their own test data, user 46 may (via a user interface of test process 10) define an example rule using the above-noted IP range as a business parameter. For example, user 46 may (via the user interface test process 10) define an example rule where requests that come from the IP ranges of user 46 should be selected 302 to be mapped to specific "internal test data store". Conversely, user 46 may (via the user interface test process 10) define an example rule where requests that come from outside the IP ranges of user 46 should be selected 302 to be mapped to different locations (e.g., a different data store, or a separate partition of the data store). As such, in the example, when a request is received (e.g., at computer 12), test process 10 may match 300 the parameters of the request (i.e., the IP range) to the above-noted rule involving IP ranges, and based upon the IP range of the request, select 302 the appropriate location of the data store to store the results of the test data.

In some implementations, the data store may include a shard. The shard may represent a partition of at least the results of the test data. For example, the shard may represent different partitions of the data. It will be appreciated that those may be essentially any persistence frameworks, such as relational databases, non-relational databases, file systems, in-memory caches, etc. In some implementations, test process 10 may include a persistence controller (e.g., persistence controller 402). Persistence controller 402 of test process 10 may act as an intelligent router, which may select 302 which location (e.g., data store shard) to access based on the decision outcome of the above-noted rule from metadata engine 400. In some implementations, test process 10 may also include an application logic (e.g., application logic 404). Application logic 404 of test process 10 may include any application code and/or logic that may communicate with certain persistence layers. In some implementations, application logic 404 may not be aware of persistence controller 402 and/or metadata engine 400, since from an application logic point of view, application logic 404 may "talks" to the persistence layers (e.g., application logic 404 may be oblivious to the fact of data sharding and routing of the above-noted requests).

As another example, user 46 may (via a user interface of test process 10) define an example rule using the above-noted customer ID as a business parameter. For instance, user 46 may (via the user interface test process 10) define an example rule where requests that include a particular customer ID should be selected 302 to be mapped to specific "internal test data store". Conversely, user 46 may (via the user interface test process 10) define an example rule where requests that do not include the particular customer ID(s) should be selected 302 to be mapped to different locations (e.g., a different data store, or a separate partition of the data store). As such, in the example, when a request is received (e.g., at computer 12), test process 10 may match 300 the parameters of the request (i.e., the customer ID) to the above-noted rule customer IDs, and based upon the customer ID in the test data (e.g., request), select 302 the appropriate location of the data store to store the results of the test data.

As yet another example, user 46 may (via a user interface of test process 10) define an example rule using the above-noted order number as a business parameter. For instance, user 46 may (via the user interface test process 10) define an example rule where requests that include a particular order number should be selected 302 to be mapped to specific "internal test data store". Conversely, user 46 may (via the user interface test process 10) define an example rule where requests that do not include the particular order number(s) should be selected 302 to be mapped to different locations (e.g., a different data store, or a separate partition of the data store). As such, in the example, when a request is received (e.g., at computer 12), test process 10 may match 300 the parameters of the request (i.e., the order number) to the above-noted rule involving order number, and based upon the order number of the request, select 302 the appropriate location of the data store to store the results of the test data. In any of the above examples, test process 10 may test some or all the functions that may be used by the customer(s) of user 46; however, as will be discussed below, the customer data may not be affected or polluted.

In some implementations, test process 10 may separate 304 the results of the test data from results of production data by storing the results of the test data at the location of the data store selected 302 based upon, at least in part, the one or more rules matched 300 to the one or more parameters of the test data. The production data may be stored by test process 10 in a production data store, wherein the production data store may be different than the data store selected 302 based upon, at least in part, the one or more rules matched 300 to the one or more parameters of the test data. For instance, and referring at least to FIG. 5, assume that the above-noted data store (e.g., shown by example as associated with storage device 16) includes at least four shards (e.g., Shard1, Shard2, Shard3, and Test Shard). Additionally, test data source and production data source may be of different types. For example, production data may be sourced from a relational data store, while test data may be sourced from a non-relational data store, file, etc. It will be appreciated that more than one data store may be associated with storage device 16.

For instance, and continuing with the above example where user 46 desires to perform internal testing with their own test data, user 46 may (via a user interface of test process 10) define an example rule using the above-noted IP range as a business parameter. For example, user 46 may (via the user interface test process 10) define an example rule where requests that come from the IP ranges of user 46 (e.g., indicating that those requests may be one of the above-noted test orders not from a customer) should be selected 302 to be mapped to specific "internal test data store". Conversely, user 46 may (via the user interface test process 10) define an example rule where requests that come from outside the IP ranges of user 46 (e.g., indicating that those requests may be one of the above-noted real submitted orders of real production data from customers) should be selected 302 to be mapped to different locations (e.g., a different data store, or a separate partition of the data store). As such, in the example, when a request is received (e.g., at computer 12), test process 10 may match 300 the parameters of the request (i.e., the IP range) to the above-noted rule involving IP ranges, and based upon the IP range of the request, select 302 the appropriate location of the data store to store the results of the test data and separate (e.g., dynamically) 304 the results of the test data from the real production data by storing the results of the test data in, e.g., Test Shard 500, and storing the results of the real production data in, e.g., Shard1.

Thus, test data stored in Test Shard 500 is not intermixed with production data stored in Shard1.

It will be appreciated that user 46 may (via the user interface test process 10) define an example rule where requests that come from the IP ranges of user 46 (e.g., indicating that those requests may be one of the above-noted real submitted orders of real production data from customers) should be selected 302 to be mapped to specific "internal test data store". Conversely, user 46 may (via the user interface test process 10) define an example rule where requests that come from outside the IP ranges of user 46 (e.g., indicating that those requests may be one of the above-noted test orders not from a customer) should be selected 302 to be mapped to different locations (e.g., a different data store, or a separate partition of the data store). As such, the rule may be define any parameter as indicating that those requests may be one of the above-noted real submitted orders of real production data from customers and/or indicating that those requests may be one of the above-noted test orders not from a customer, or vice versa.

As another example, user 46 may (via a user interface of test process 10) define an example rule using the above-noted customer ID as a business parameter. For instance, user 46 may (via the user interface test process 10) define an example rule where requests that include a particular customer ID (e.g., indicating that those requests may be one of the above-noted test orders not from a customer) should be selected 302 to be mapped to specific "internal test data store". Conversely, user 46 may (via the user interface test process 10) define an example rule where requests that do not include the particular customer ID(s) (e.g., indicating that those requests may be one of the above-noted real submitted orders of real production data from customers) should be selected 302 to be mapped to different locations (e.g., a different data store, or a separate partition of the data store). As such, in the example, when a request is received (e.g., at computer 12), test process 10 may match 300 the parameters of the request (i.e., the customer ID) to the above-noted rule customer IDs, and based upon the customer ID in the test data (e.g., request), select 302 the appropriate location of the data store to store the results of the test data and separate (e.g., dynamically) 304 the results of the test data from the real production data by storing the results of the test data in, e.g., Test Shard 500, and storing the results of the real production data in, e.g., Shard2. Thus, test data stored in Test Shard 500 is not intermixed with production data stored in Shard2.

As yet another example, user 46 may (via a user interface of test process 10) define an example rule using the above-noted order number as a business parameter. For instance, user 46 may (via the user interface test process 10) define an example rule where requests that include a particular order number (e.g., indicating that those requests may be one of the above-noted test orders not from a customer) should be selected 302 to be mapped to specific "internal test data store". Conversely, user 46 may (via the user interface test process 10) define an example rule where requests that do not include the particular order number(s) (e.g., indicating that those requests may be one of the above-noted real submitted orders of real production data from customers) should be selected 302 to be mapped to different locations (e.g., a different data store, or a separate partition of the data store). As such, in the example, when a request is received (e.g., at computer 12), test process 10 may match 300 the parameters of the request (i.e., the order number) to the above-noted rule involving order number, and based upon the order number of the request, select 302 the appropriate location of the data store to store the results of the test data and separate (e.g., dynamically) 304 the results of the test data from the real production data by storing the results of the test data in, e.g., Test Shard 500, and storing the results of the real production data in, e.g., Shard3. Thus, test data stored in Test Shard 500 is not intermixed with production data stored in Shard3.

It will be appreciated that Shard1, Shard2, and Shard3 may store any of the above-noted production data singly or in any combination without departing from the scope of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   matching, at a computing device, one or more parameters of test data to one or more rules, wherein the one or more parameters are metadata associated with the test data and include a business parameter and the one or more rules are defined by a user via a user interface and the matching is performed by a metadata engine and wherein the business parameter includes an Internet Protocol (IP) range;
   selecting a location of a data store to store results of the test data, wherein the location is selected based upon, at least in part, the one or more rules matched to the one or more parameters of the test data by the metadata engine; and
   separating the results of the test data from results of production data by storing the results of the test data at the location of the data store selected based upon, at least in part, the one or more rules matched to the one or more parameters of the test data, wherein the results of the production data is stored in a production data store, wherein the production data store is different than the data store selected based upon, at least in part, the one or more rules matched to the one or more parameters of the test data by the metadata engine, wherein the one or more rules include storing the test data with one or more business parameters including an IP addresses within the IP range at the location at the data store and storing the production data with one or more business parameters including an IP addresses outside of the IP range in the production data store.

2. The computer-implemented method of claim 1 wherein the business parameter includes a company Identification (ID).

3. The computer-implemented method of claim 2 wherein the one or more rules include storing the test data with one or more business parameters including the company ID at the location at the data store and storing the production data with one or more business parameters not including the company ID in the production data store.

4. The computer-implemented method of claim 1 wherein the data store includes a shard.

5. The computer-implemented method of claim 4 wherein the shard represents a partition of at least the results of the test data.

* * * * *